(12) United States Patent
Hoeller et al.

(10) Patent No.: US 12,117,417 B2
(45) Date of Patent: *Oct. 15, 2024

(54) METHOD FOR PRODUCING A FIBER-REINFORCED PLASTIC COMPARISON BODY AND TESTING METHOD

(71) Applicant: FACC AG, Ried im Innkreis (AT)

(72) Inventors: Helmuth Hoeller, Ried im Innkreis (AT); Anna Carina Spindler, Ried im Innkreis (AT); Stefan Kroissmayr, Ried im Innkreis (AT)

(73) Assignee: FACC AG, Ried im Innkreis (AT)

( * ) Notice: Subject to any disclaimer, the term of this patent is extended or adjusted under 35 U.S.C. 154(b) by 76 days.

This patent is subject to a terminal disclaimer.

(21) Appl. No.: 17/268,073

(22) PCT Filed: Sep. 10, 2019

(86) PCT No.: PCT/AT2019/060292
§ 371 (c)(1),
(2) Date: Feb. 11, 2021

(87) PCT Pub. No.: WO2020/051609
PCT Pub. Date: Mar. 19, 2020

(65) Prior Publication Data
US 2021/0316516 A1    Oct. 14, 2021

(30) Foreign Application Priority Data
Sep. 10, 2018   (AT) .............................. A 50765/2018

(51) Int. Cl.
  *B29C 70/30*    (2006.01)
  *B29C 70/06*    (2006.01)
  (Continued)

(52) U.S. Cl.
  CPC ........... *G01N 29/043* (2013.01); *B29C 70/06* (2013.01); *B29C 70/30* (2013.01); *G01N 25/72* (2013.01)

(58) Field of Classification Search
  CPC .............................. B29C 70/30; G01N 25/72
  See application file for complete search history.

(56) References Cited

U.S. PATENT DOCUMENTS 4,120,998 A * 10/1978 Olez .......................... B64C 1/26
                                                        156/169
4,696,711 A *  9/1987 Greszczuk .............. B32B 38/10
                                                        156/193
(Continued)

FOREIGN PATENT DOCUMENTS

CN      101903161 A    12/2010
CN      102650605 A     8/2012
(Continued)

OTHER PUBLICATIONS

1 Intellectual Property India, Office Action Issued in Application No. 202117009155, Jul. 29, 2021, 5 pages.
(Continued)

*Primary Examiner* — Andrew D Graham
(74) *Attorney, Agent, or Firm* — McCoy Russell LLP

(57) ABSTRACT

The invention relates to a method for producing a fiber-reinforced plastic (FRP) comparison body for modeling a layer porosity for the non-destructive testing of FRP components, comprising the following steps: i. producing a first part by a. arranging a first FRP layer having a cut-out; b. arranging at least one second FRP layer on the first FRP layer; c. prehardening the assembly of the first FRP layer and the second FRP layer in order to obtain the first part; ii. producing a second part by a. arranging further FRP layers; b. pre-hardening the assembly of further FRP layers in order to obtain the second part; iii. joining the first part to the
(Continued)

second part, the cut-out on the first part facing the second part; and iv. hardening the assembly of the first part and the second part, a layer porosity being formed at the cut-out in the first FRP layer.

12 Claims, 4 Drawing Sheets

(51) Int. Cl.
*G01N 25/72* (2006.01)
*G01N 29/04* (2006.01)

(56) References Cited

U.S. PATENT DOCUMENTS

| | | | | |
|---|---|---|---|---|
| 5,116,216 | A * | 5/1992 | Cochran | B29C 70/44 |
| | | | | 156/286 |
| 5,170,367 | A * | 12/1992 | Mackay | G01N 29/30 |
| | | | | 702/22 |
| 5,741,382 | A * | 4/1998 | Ma | B29C 70/54 |
| | | | | 156/73.6 |
| 6,824,851 | B1 * | 11/2004 | Locher | B29C 70/086 |
| | | | | 428/72 |
| 9,862,144 | B2 * | 1/2018 | Lane | B29C 70/44 |
| 2007/0028661 | A1 * | 2/2007 | Girshovich | G01N 29/30 |
| | | | | 73/1.01 |
| 2007/0095141 | A1 * | 5/2007 | Puckett | G01N 29/348 |
| | | | | 73/649 |
| 2010/0304118 | A1 * | 12/2010 | Baidak | C08J 3/24 |
| | | | | 525/50 |
| 2011/0143082 | A1 * | 6/2011 | Fritz | B29C 70/30 |
| | | | | 428/77 |
| 2012/0231202 | A1 * | 9/2012 | Takemura | B32B 38/04 |
| | | | | 156/253 |
| 2013/0012086 | A1 * | 1/2013 | Jones | C08J 5/244 |
| | | | | 428/221 |
| 2013/0014468 | A1 * | 1/2013 | Ehsani | E04G 23/0225 |
| | | | | 264/261 |
| 2014/0144568 | A1 * | 5/2014 | MacAdams | B29C 66/73941 |
| | | | | 156/62.8 |
| 2014/0272324 | A1 * | 9/2014 | Chen | B32B 5/02 |
| | | | | 156/60 |
| 2014/0346405 | A1 * | 11/2014 | Ferguson | G01N 15/088 |
| | | | | 252/408.1 |
| 2016/0103101 | A1 | 4/2016 | Clarkson | |
| 2016/0158975 | A1 * | 6/2016 | Suzuki | B29C 43/02 |
| | | | | 428/174 |
| 2017/0043541 | A1 * | 2/2017 | Khan | B29C 70/545 |
| 2017/0057208 | A1 * | 3/2017 | Oosawa | B32B 27/34 |
| 2017/0207105 | A1 * | 7/2017 | Kasai | B29C 70/70 |
| 2017/0274604 | A1 | 9/2017 | Kobayashi et al. | |
| 2018/0162019 | A1 * | 6/2018 | Ducrot | B29C 33/42 |
| 2020/0148846 | A1 * | 5/2020 | Furukawa | B29C 70/10 |
| 2021/0190710 | A1 * | 6/2021 | Hoeller | B32B 5/26 |
| 2021/0316516 | A1 * | 10/2021 | Hoeller | B29C 70/06 |

FOREIGN PATENT DOCUMENTS

| | | |
|---|---|---|
| CN | 102830001 A | 12/2012 |
| CN | 103402741 A | 11/2013 |
| CN | 104407060 A | 3/2015 |
| CN | 106796205 A | 5/2017 |
| EP | 1750123 A2 | 2/2007 |
| EP | 2572871 A2 | 3/2013 |
| EP | 3193164 A1 | 7/2017 |
| JP | 2016070852 A | 5/2016 |

OTHER PUBLICATIONS

ISA European Patent Office, International Search Report Issued in Application No. PCT/AT2019/060292, Dec. 12, 2019, WIPO, 2 pages.
State Intellectual Property Office of the People's Republic of China, Office Action and Search Report Issued in Application No. 201980058474.2, Jul. 31, 2023, 19 pages. (Submitted with Partial Translation).

* cited by examiner

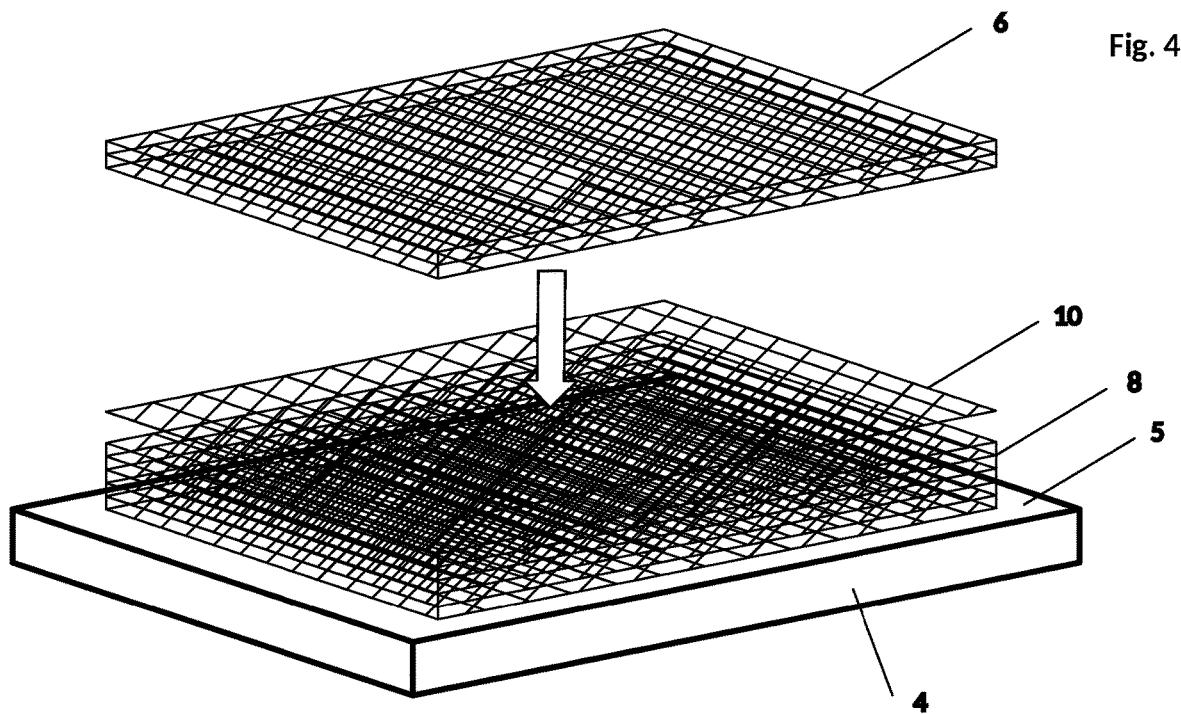
Fig. 4
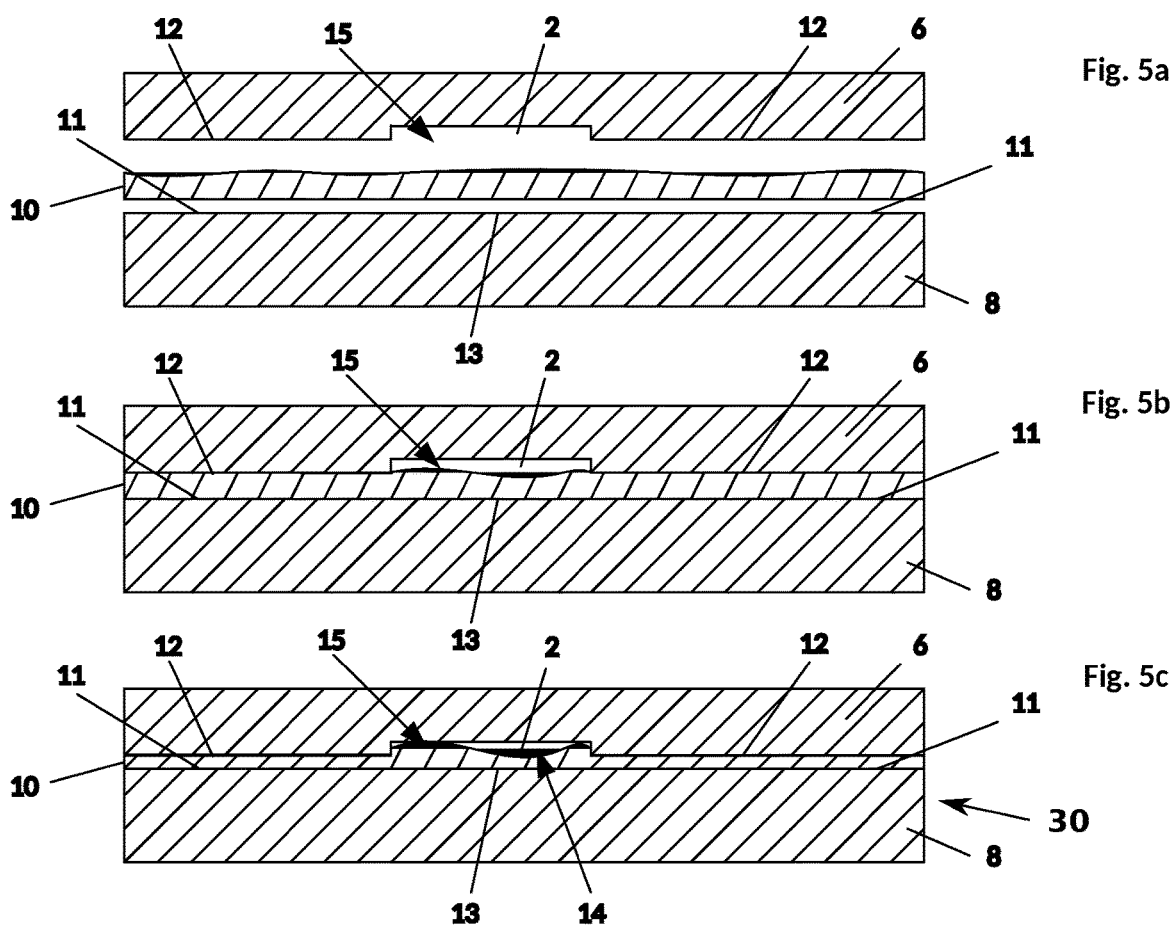
Fig. 5a
Fig. 5b
Fig. 5c

METHOD FOR PRODUCING A FIBER-REINFORCED PLASTIC COMPARISON BODY AND TESTING METHOD

CROSS REFERENCE TO RELATED APPLICATIONS

The present application is a U.S. National Phase of International Application No. PCT/AT2019/060292 entitled "METHOD FOR PRODUCING A FIBER-REINFORCED PLASTIC COMPARISON BODY AND TESTING METHOD," and filed on Sep. 10, 2019. International Application No. PCT/AT2019/060292 claims priority to Austrian Patent Application No. A 50765/2018 filed on Sep. 10, 2018. The entire contents of each of the above-listed applications are hereby incorporated by reference for all purposes.

TECHNICAL FIELD

The invention relates to a method for producing a fibre-reinforced plastic (FRP) comparison body for modelling a layer porosity for the non-destructive testing of FRP components, in particular aircraft components.

The invention further relates to a method for non-destructive testing of an FRP component, in particular aircraft component.

BACKGROUND AND SUMMARY

During the manufacture of safety-critical fibre-reinforced plastic (FRP) components (fibre-plastic-composite components) such as, for example, aircraft components, the subsequent testing and detection of component defects is of particular importance. For this purpose non-destructive test methods (Engl. "non-destructive testing", NDT for short) are usually used in order, on the one hand, to be able to detect defective components immediately and on the other hand, not to damage defect-free components by the test method itself. In order to be able to also draw conclusions as to potential sources of defects in production during the test method, detected component defects are assigned to a type of defect or a defect class. For comparison and calibration purposes, comparison bodies with specifically introduced artificial component defects are produced for this purpose and measured with the aid of a NDT method. In order to ensure in this case the exact assignment of a component error to an error class, the artificial component defects in the comparison bodies, which component defects serve as a reference, must model the production defects of the blanks (test specimens) as precisely as possible.

However, most component defects are difficult to model and so far artificial component defects differ more or less substantially from the defects of the blanks, depending on type of defect, in view of the condition. In particular, a so-called layer porosity can so far not be modelled satisfactorily. The layer porosity relates in this case to a concentrated accumulation of microscopic and macroscopic gas or air inclusions in the matrix or the connecting means of the FRP material between two FRP layers of a component. Thus, the layer porosity should be distinguished from a delamination, i.e. a flat separation of two FRP layers and a volume porosity, i.e. a distribution of micro- and macroscopic gas inclusions (pores) in the matrix of the FRP laminate substantially over the entire cross-section of the FRP laminate. Since a layer porosity results in a partial separation of the FRP layers and therefore in particular in aircraft components can have serious consequences, the identification of a layer porosity and therefore the production of comparison bodies with the most realistic simulation of the layer porosity is of high importance.

Various methods for modelling component defects are known from the prior art. In EP 3 193 164 A1, for example, a method is described in which component errors can be introduced into FRP parts with the aid of an expansion body. To this end, the expansion body is placed between several layers of FRP material, resin is added and then heated. As a result of the high coefficient of expansion of the expansion body, during cooling this shrinks more substantially than the FRP material surrounding it and thus produces a large remaining cavity. The expansion body then remains as a foreign body in the component.

In CN 104407060 a porosity of the material is simulated with the aid of glass spheres which are introduced into the material during the production process. However, these also remain in the material.

In addition, a method for producing porosity in composite materials is known from US 2014/0346405 A1. For this purpose, the composite materials are exposed to different hardening methods in order to thus produce different degrees of porosity by escaping gases.

A method for modelling component defects in composite materials is further known from EP 1 750 123 A2. Here holes are cut in layers, the individual layers are partially hardened and only then connected to one another.

A measurement method for composite materials is additionally known from US 2007/0095141 A1 in which composite materials component defects are introduced with the aid of a laser.

A disadvantage is that in the comparison bodies known from the prior art, false detections frequently occur since in the known test methods as a result of the foreign bodies remaining in the comparison body, the measurement result is falsified and also it cannot be ascertained whether the simulated component defect or the foreign body is detected. On the other hand, in those methods which allow the production of component defects without remaining foreign bodies in the comparison body, the specific introduction of component defects at provided positions in the comparison bodies is not possible which makes them considerably more difficult to detect. However, all these known methods furthermore have in common that they cannot model a layer porosity at all, i.e. a partial separation of individual FRP layers of an FRP component, or can only model this unsatisfactorily.

It is therefore the object of the invention to ameliorate or to eliminate at least individual disadvantages of the prior art. The invention therefore in particular has the aim of providing a method in which the realistic modelling of a layer porosity at defined positions in an FRP comparison body is made possible.

The formulated object is achieved in this case by a method comprising at least the following steps:
  i. producing a first part for the FRP comparison body by
    a. arranging a first FRP layer with a cut-out (clearance);
    b. arranging at least one second FRP layer on the first FRP layer;
    c. pre-hardening the arrangement of first and second FRP layer to obtain the first part for the FRP comparison body;
  ii. producing a second part for the FRP comparison body by
    a. arranging at least one further FRP layer;

b. pre-hardening the arrangement of at least one further FRP layer in order to obtain the second part for the FRP comparison body;

iii. connecting the first part to the second part wherein the cut-out on the first part is facing the second part; and iv. hardening the arrangement of first part and second part, wherein a layer porosity is formed on the cut-out in the first FRP layer.

In the method according to the invention, the sequence of individual steps can be changed. Thus, the second part for the FRP comparison body can be produced before the first part for the FRP comparison body.

Advantageously, the method according to the invention enables the specific introduction of an (artificial) layer porosity in an FRP comparison body which consists of FRP material and therefore models layer porosities in the FRP components to be tested, in particular for the aircraft industry, in a realistic manner. As a result of the method according to the invention, the layer porosity can be produced without introducing a foreign body and also without large-volume gas inclusion. For calibration purposes the FRP comparison body can then be subject to an NDT measurement method, for example, a thermography method. As a result of the realistic condition of the modelled layer porosity, the measurement results obtained from the comparison body are particularly well suited as comparison or reference values for the NDT testing of FRP components. Since when creating the comparison body, the introduction of foreign bodies, i.e. parts not consisting of the FRP material and usually not provided on the component to be compared, can be dispensed with, measurement curves of the FRP comparison body can be recorded which correspond with a high degree of accuracy to those of components which have a "natural" layer porosity, i.e. formed during series production. As mentioned initially, a "natural" layer porosity is in this case a concentrated accumulation of microscopic and macroscopic gas or air inclusions in the matrix or in the connecting material of the FRP material between two FRP layers which results in a partial separation of the FRP layers. The individual FRP layers are formed in the FRP comparison body—as in the FRP components to be tested—preferably by loose fibres or fibres connected to fabrics which fibres are impregnated with resin or another connection means. The connection means is used to connect the fibres within an FRP layer and to connect the FRP layers. Inter alia, CFRP carbon-fibre reinforced plastic), GFRP (glass-fibre reinforced plastic) or aramid fibres, in particular GFRP, aramid or CFRP materials processed to form prepregs, can be provided as FRP material for all the FRP layers. The individual FRP layers in the first or second part can be connected by a connection means, preferably contained in the FRP layers.

The layer porosity is modelled in the method according to the invention by connecting the first part to the second part each in the pre-hardened (pre-cured) state with the aid of a connection means which is also present in FRP materials such as, for example, resin, a different matrix material or an unhardened FRP layer, and final hardening (curing) of the layer structure produced. In this case, those sections of the second part which are facing the first part and not opposite the cut-out (clearance), are substantially completely and extensively (over the area) connected to the corresponding sections of the first part, whereas those sections of the second part which are opposite the cut-out, are only partially and therefore not completely connected to the first part. As a result, the layer porosity is restricted to the region of the cut-out. Preferably a plurality of cut-outs and therefore a plurality of layer porosities are produced in the previously described manner in order to thereby obtain, for example, a variation in the degree of connection or the separation for comparison purposes. The layer porosity is produced in this case by the lack of pressure in the region of the cut-out when joining the parts to one another. Preferably the pre-hardened first part and the pre-hardened second part are arranged horizontally, wherein the first part is placed on the second part and a connection means is provided. According to a preferred embodiment, by pressing the first part onto the second part before and/or during the hardening using a hardening method suitable for the FRP material used, a positive connection is produced at those positions at which no cut-out is provided whereas in the cut-out the connection means only partially adheres to the first or the second part. It is essential in this case that both parts are pre-hardened before connecting, i.e. that the two parts are hardened so far that for the further process steps these parts retain their shape substantially by themselves and thus are dimensionally stable. The first hardening steps of a hardening method (curing method) suitable for the FRP material used can be used for the pre-hardening, i.e. the hardening method is ended as soon as the parts are hardened to such an extent that they substantially retain their shape by themselves for the further process steps. As a result of the pre-hardening of the first part, the air collected inside the cut-out is enclosed during connection to the second part with the result that an air inclusion is formed. This air inclusion persists even when evacuating the arrangement of the first and the second part when connecting them since the air cannot escape through the pre-hardened first part and the second part. After the first part has been connected to the second part, the arrangement of first and second part is hardened. Hardening means in this context that the first and second part and the connection means are completely hardened by a hardening process suitable for the FRP material used. A layer porosity produced by the method according to the invention can, like its natural counterpart, be locally restricted or produced at several positions in the FRP comparison body. In the case of layer porosity at several positions within an FRP layer, a plurality of cut-outs should accordingly be produced in the first part. In the case of layer porosities in different FRP layers, a plurality of first or second parts should be produced accordingly, wherein a first part can form a second part which in turn is assigned to a different first part. Preferably a layer porosity is arranged completely inside an FRP component or FRP comparison body and thus surrounded by FRP material on all sides. In order to obtain the desired defect size of the layer porosity by the method according to the invention, it is preferably provided that the cut-out comprises a greater width and/or length than the provided length or width of the layer porosity in the hardened (end) state of the FRP comparison body. The greater width and/or length is dependent on the connection means and its viscosity and lies in particular in the range between 0.1 mm and 10 mm.

In order to facilitate the connection of the first part to the second part and produce a particularly realistic layer porosity, it is advantageous if for connecting the first part to the second part an FRP intermediate layer is arranged in the unhardened state between the first part and the second part. An unhardened FRP layer like an impregnated FRP intermediate layer is not yet pre-hardened or hardened and can therefore still be changed in its shape. The unhardened intermediate layer contains connection means and thereby makes it possible to connect the first part to the second part. For connecting, the pre-hardened second part is preferably brought into a horizontal position, the unhardened FRP layer is initially connected to the pre-hardened second part and then the pre-hardened first part is connected to the unhardened FRP layer in such a manner that the cut-out is facing the unhardened FRP layer. The unhardened FRP intermediate layer provides the connection means. It is also possible to initially bring the pre-hardened first part into a horizontal position, to connect the unhardened FRP layer to the pre-hardened first part and then connect the pre-hardened second part to the unhardened FRP layer in such a manner that the cut-out is facing the unhardened FRP layer.

Particularly advantageous conditions are obtained if the cut-out is formed on the first part by cutting out the first FRP layer. As a result, it is considerably easier to produce the first part and various shapes of the cut-out can be simply cut out from the first FRP layer of the first part according to the desired defect shape or defect contour.

In order to produce an exactly defined recess which is delimited by the cut-out and the at least one second FRP layer located thereabove, it is advantageous if the cut-out is filled with a placeholder before the pre-hardening of the arrangement of first and second FRP layer, wherein the placeholder is removed before the hardening of the arrangement of first and second part from the cut-out or the recess. It can thereby be prevented that the at least one second FRP layer, in particular in the unhardened state projects into the cut-out through its own weight and thus disadvantageously influences the shape of the recess and the modelling of the layer porosity. Advantageously for this purpose the placeholder comprises substantially the same shape or contour as the cut-out. Preferably the placeholder furthermore comprises a height which is smaller than the thickness of the first FRP layer.

The cut-out preferably comprises a length of 4 mm to 25 mm, in particular of 6 mm to 20 mm, for example, substantially 10 mm, a width of 4 mm to 25 mm, in particular of 6 mm to 20 mm, for example, substantially 10 mm and a height of 0.01 mm to 2 mm, in particular of 0.05 mm to 1 mm. Preferably it is provided that the placeholder and the cut-out comprise a greater width and/or length than the provided length or width of the layer porosity in the hardened state of the FRP comparison body. The greater width and/or length is dependent on the connection means and its viscosity and lies in particular in the range between 0.1 mm and 10 mm.

In a first preferred embodiment, an insert plate, in particular made of metal, is provided as placeholder. Such an insert plate can be manufactured easily and with low manufacturing costs and can be re-used if required.

In a second preferred embodiment a projection on a mould carrier is provided as placeholder. A mould carrier is in this case a carrier on which unhardened FRP layers can be placed, wherein the mould carrier predefines the subsequent shape of the pre-hardened or hardened FRP layers, for example, by a curvature or a flat surface. Advantageously, a desired position or an orientation of the first FRP layer can be predefined by the projection on the mould carrier.

In order to facilitate the release of the placeholder from the pre-hardened FRP layers, it is advantageous if the placeholder is provided with a separating means (or release agent) or a separating foil before insertion into the cut-out. As a result, the placeholder can be removed without damaging the first part. Naturally, other parts such as, for example, a mould carrier can also be provided with such separating means in order to be able to easily release all the FRP components.

The FRP comparison body described above can be used for the NDT testing of FRP components.

The method for non-destructive testing of an FRP component, in particular aircraft component, comprises at least the following steps:
producing a fibre-reinforced plastic (FRP) comparison body (fibre-plastic-composite comparison body);
testing the FRP component by means of a non-destructive test method, for example, a thermography method; and
comparing test results from the non-destructive test method for the FRP component with comparative values from the FRP comparison body.

The invention is explained further hereinafter with reference to preferred embodiments.

BRIEF DESCRIPTION OF THE FIGURES

FIG. 4 shows the joining together of the first and the second part with the aid of an FRP intermediate layer.

FIGS. 5a-5c show the joining together of the first and the second part with the aid of an FRP intermediate layer in cross-sectional view and the production of the layer porosity.

DETAILED DESCRIPTION

The figures show individual process steps for producing an FRP comparison body 30 which can be used in the NDT testing of FRP components such as, for example, aircraft wings or aircraft flaps.

Figure 1:
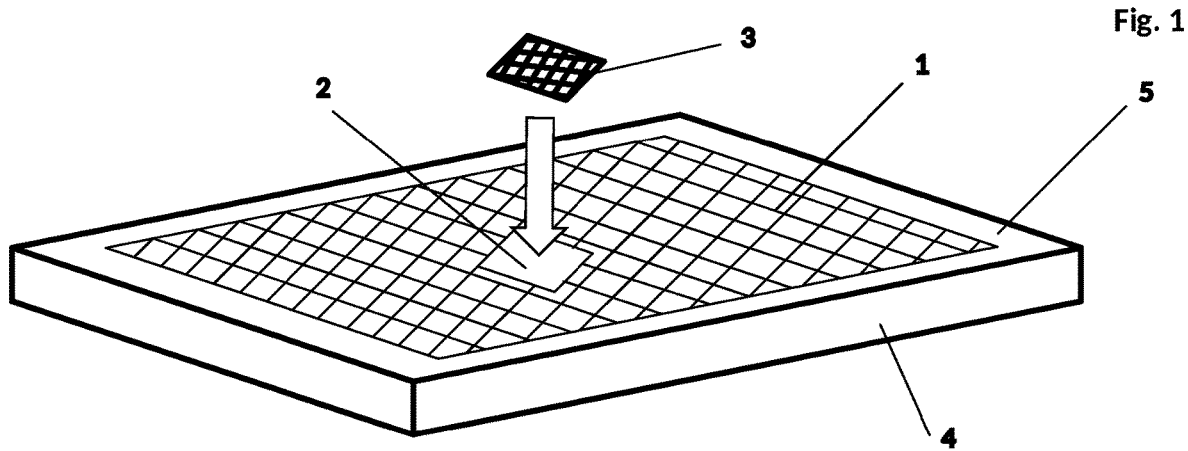
FIG. 1 shows a view of a first FRP layer of a first part with a cut-out for an FRP comparison body for simulating a layer porosity.

FIG. 1 shows a first (unhardened) FRP layer 1 in which a cut-out 2 (clearance 2) has been cut with the aid of a suitable knife or another cutting tool. Preferably the first FRP layer 1, as is usually the case particularly in aircraft components, consists of CFRP, GFRP, aramid fibres, in particular of CFRP, aramid or GFRP materials processed to form prepregs. In order to prevent FRP layers subsequently located thereabove from penetrating into the cut-out 2 due to their own weight, a placeholder 3 is inserted into the clearance 2 in the direction of the arrow. For this purpose the placeholder 3 preferably comprises substantially the same shape or contour as the cut-out 2 and maximally the height or thickness of the first FRP layer 1. The depicted first FRP layer 1 and the FRP layers subsequently located thereabove (not shown) are still in this initial process step in an unhardened, i.e. malleable state and are arranged on a mould carrier 4. The mould carrier 4 predefines the subsequent shape of the (pre-)hardened FRP layers, in this case a flat surface 5.

Figure 2:
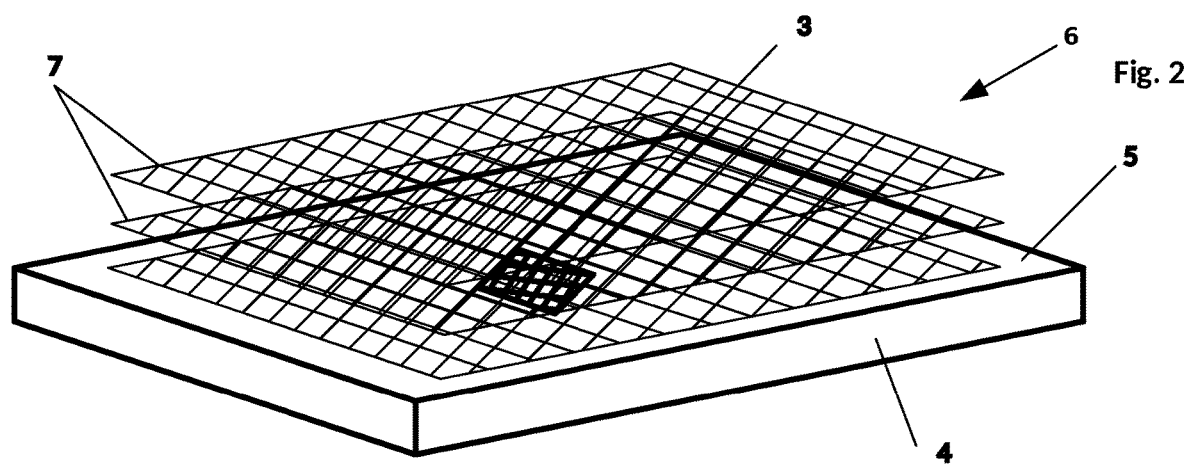
FIG. 2 shows an exploded view of a first part with a first FRP layer and two second FRP layers.

FIG. 2 shows a first part 6 in an exploded view. The first part in this case comprises the first FRP layer 1 and at least one second FRP layer 7. The individual FRP layers of the first part are connected to one another in the assembled state using a connection means preferably contained in the FRP layers. In the method according to the invention, the at least one second FRP layer 7 in the unhardened state is placed on the first FRP layer 1 also in the unhardened state and the first part 6 thereby formed is subsequently pre-hardened by corresponding methods known to the person skilled in the art whereas the placeholder 3 remains in the cut-out 2. Such a pre-hardening method can, for example, be carried out by a hardening method in an autoclave using a vacuum bag (not shown). As a result of the placeholder 3 inserted in the cut-out 2, after arranging the at least one second FRP layer 7 on the at least one first FRP layer 1, it can be prevented that the unhardened second FRP layer 7 projects into the cut-out 2 or bulges into the cut-out 2 as a result of its own weight. For this purpose, the placeholder 3 comprises substantially the same shape or contour as the cut-out 2 and maximally the height or thickness of the first FRP layer 1. After the pre-hardening, the placeholder 3 is removed again and in this way leaves behind a recess 15 delimited by the cut-out 2 and the at least one second FRP layer 7 located thereabove. In order to facilitate the removal of the placeholder 3, this can be provided with a separating means (not shown). The mould carrier 4 itself can also be provided with such a separating means.

Figure 3:
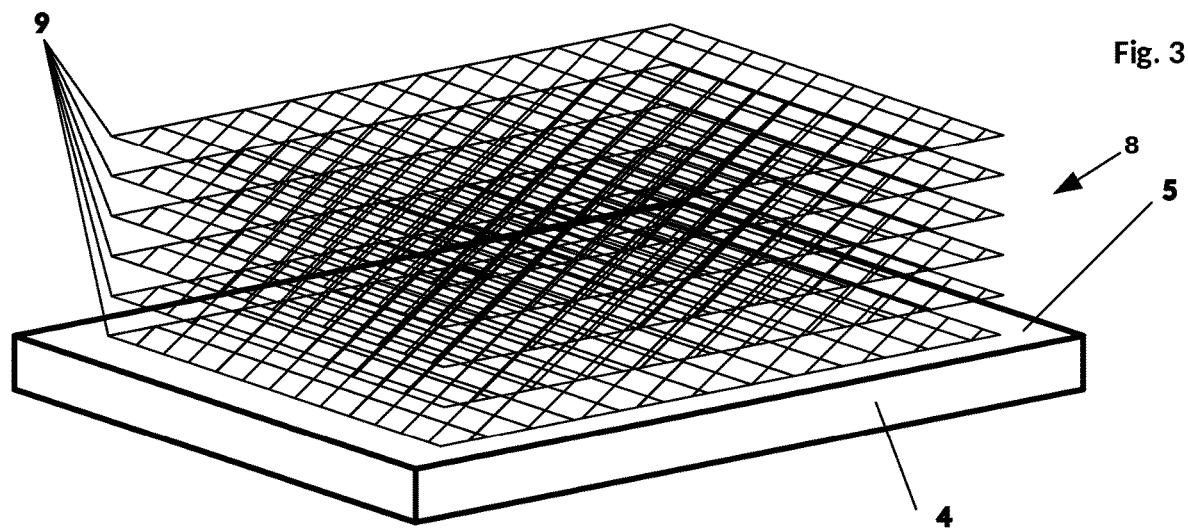
FIG. 3 shows an exploded view of a second part.

FIG. 3 shows an exploded view of a second part 8. In the exemplary embodiment shown this comprises a plurality of further FRP layers 9 which are also initially joined together and then pre-hardened by appropriate methods known to the person skilled in the art. The individual FRP layers of the second part are connected to one another in the assembled state, using a connection means preferably contained in the FRP layers. In the diagram shown the further FRP layers 9 are also arranged on a mould carrier 4 and thereby acquire their subsequent shape, in this case a flat surface 5.

FIG. 4 shows the connection of the pre-hardened first part 6 to the pre-hardened second part 8. In this case, the second part 8 is located in the horizontal position on the mould carrier 4. The first part 6 is arranged for connecting so that the cut-out 2 of the first part 6 faces the second part 8 with the result that a volume is enclosed by the first part 6 and by the second part 8. As can be seen in FIG. 4, an FRP intermediate layer 10 in the unhardened state is arranged between the first part 6 and the second part 8 for connecting the first part 6 to the second part 8.

When connecting the first part 6 to the second part 8 (FIG. 5a-5c), those sections 11 of the second part 8 which are facing the first part 6 and which are not opposite the cut-out 2 are connected substantially completely and extensively via the FRP intermediate layer 10 to the corresponding sections 12 of the first part 6 whereas those sections 13 of the second part 8 which are located opposite the cut-out 2 are connected only partially and therefore not completely via the FRP intermediate layer 10 to the first part 1. The second part 8 is preferably flat throughout, i.e. free from cut-outs, indentations and bulges, at least in that region which lies opposite the cut-out 2. After the first part 6 has been connected to the second part 8, the arrangement consisting of first part 6 and second part 8 is hardened whereby an (artificial) layer porosity 14 is formed on the cut-out 2 or in the recess 15. The hardening and the pre-hardening are accomplished by a hardening method suitable for the FRP material in particular in an autoclave preferably at a pressure of 2.5 to 8 and at a temperature of 120° C. to 180° C. The precise pressure and the precise temperature however depend on the material used.

FIGS. 5a to 5c show the formation of the layer porosity 14 in cross-sectional view of the FRP layers. In FIG. 5a the pre-hardened second part 8, the FRP intermediate layer 10 in the unhardened state and the pre-hardened first part 6 can be seen one above the other but not yet in contact. In FIG. 5b the pre-hardened second part 8, the FRP intermediate layer 10 in the unhardened state and the pre-hardened first part 6 are already brought into contact. It can be seen that the FRP intermediate layer 10 does not touch the at least one second FRP layer 7. Only those sections 11 of the second part 8 which are facing the first part 6 and which are not located opposite the cut-out 2 are connected substantially completely and extensively via the FRP intermediate layer 10 to the corresponding sections 12 of the first part 6. Those sections 13 of the second part 8 which are located opposite the cut-out 2 are, however, not connected to the first part 6 via the FRP intermediate layer 10. It can be seen in FIG. 5c how the FRP intermediate layer 10 is pressed together by pressing the first part 6 onto the second part, for example by pressure in the autoclave, with the result that even in the recess 15 this results in partial connection or adhesion of the FRP intermediate layer 10 to the first part 6 or the at least one second FRP layer 7. By hardening the arrangement consisting of the first part 6 and the second part 8, the layer porosity 14 is formed and an FRP comparison body 30 is produced.

Figure 6:
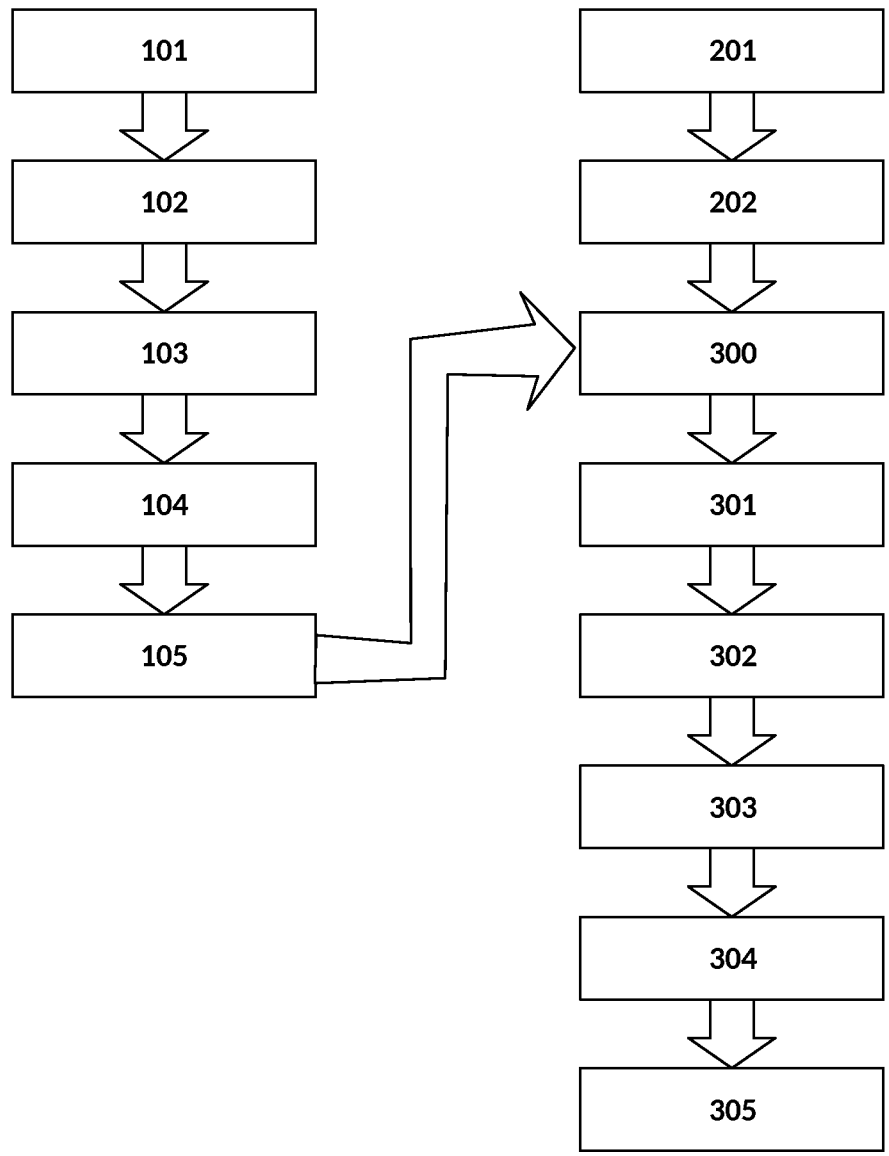
FIG. 6 shows a flow diagram of the method according to the invention for producing an FRP comparison body in a preferred embodiment.

FIG. 6 shows a flow diagram of the method according to the invention for producing an FRP comparison body 30 in a preferred embodiment, where an FRP intermediate layer 10 in the unhardened state is used as connection means. In a first step 101 the first FRP layer 1 in the unhardened state is preferably placed on a mould carrier 4. Then the cut-out 2 is cut with the aid of a cutting tool, for example, a knife, into the first FRP layer 1 (step 102). In step 103 a placeholder 3 is inserted into the cut-out 2 or alternatively the FRP layer 1 is placed on a projection of the mould carrier 4 so that the projection projects into the cut-out 2 and at least partially fills the cut-out 2. Then at least one second FRP layer 7 in the unhardened state is placed on the first FRP layer 1 (step 104). Then the arrangement of first and second FRP layer is pre-hardened by an appropriate method known to the person skilled in the art in order to obtain the first part 6 for the FRP comparison body 30 (step 105).

In order to produce the second part 8 a plurality of further FRP layers 9 in the unhardened state are arranged in parallel on a mould carrier 4 (step 201) and pre-hardened by an appropriate method known to the person skilled in the art (step 202).

In a step 300 the first part 6 and the second part 8 are brought together spatially for the next process steps. For this purpose the second part is placed on the mould carrier 4 (step 301). Then the FRP intermediate layer 10 (or another connection means) is placed on the first part 6 (step 302). Then the placeholder 3 is removed from the first part 1 (step 303). This step can also take place beforehand but only after the pre-hardening of the first part 6. In step 304 the first part 6 is placed on the FRP intermediate layer 10 for connecting in such a manner that the cut-out 2 of the first part 6 is facing the second part 8. In step 305 the arrangement of first part 6 and second part 8 together with intermediate layer 10 is hardened in a method suitable for the FRP material and in so doing is preferably pressed together. As a result, the layer porosity 14 is formed on the cut-out 2 in the first FRP layer 1 and the FRP comparison body 30 is formed.

Figure 7:
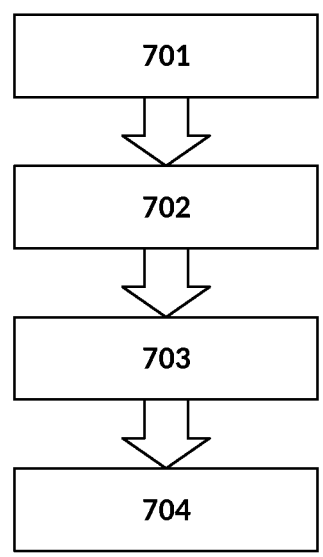
FIG. 7 shows a flow diagram of an NDT test method using an FRP comparison body produced by the method described in other embodiments of the application.

FIG. 7 shows a preferred process sequence of an NDT test method using an FRP comparison body 30. In a step 701 an FRP comparison body 30 is produced by the process sequence according to FIG. 6. In a step 702 the comparison body 30 is tested using a non-destructive test method, for example a thermography method or an ultrasound method in order to detect and measure the artificially produced layer porosity in the FRP comparison body 30. Comparison values can thus be specified. In a step 703 an FRP component of FRP material, in particular an aircraft component, is tested by the same non-destructive test method in order to obtain test results. In a step 704, the test results from step 703 are compared with the comparison values from step 702 in order to thus be able to perform an assessment of the FRP component in relation to any component defects, in particular a layer porosity. For this purpose, preferably signal amplitudes or other types of signal produced by the non-destructive test method are compared with one another. In the event of a specified limiting value being exceeded which can be derived from the comparison values, a defective FRP component can be identified.

The invention claimed is:

1. A method for producing a fibre-reinforced plastic (FRP) comparison body, wherein the comparison body can be used for modelling a layer porosity and for the non-destructive testing of FRP components, the method comprising:
   i. Producing a first part of the FRP comparison body by
      a. arranging a first FRP layer, the first FRP layer including a hole;
      b. arranging at least one second FRP layer on said first FRP layer; and
      c. pre-hardening the arrangement of said first FRP layer and said at least one second FRP layer to obtain said first part of the FRP comparison body, wherein a placeholder separate from the first FRP layer is inserted into the hole after the hole is produced and before the pre-hardening of the arrangement of said first FRP layer and said at least one second FRP layer, wherein the placeholder is a plate, wherein the placeholder remains in the hole when the arrangement of said first FRP layer and said at least one second FRP layer is pre-hardened, wherein the placeholder prevents the at least one second FRP layer of the arrangement of said first FRP layer and said at least one second FRP layer from projecting into the hole, and wherein the placeholder is removed from the hole before the hardening of an arrangement of the first part and a second part of the FRP comparison body;
   ii. producing the second part of the FRP comparison body by
      a. arranging at least one further FRP layer; and
      b. pre-hardening the arrangement of said at least one further FRP layer in order to obtain said second part of the FRP comparison body;
   iii. connecting said first part to said second part, wherein the hole on said first part is facing said second part; and
   iv. hardening the arrangement of said first part and said second part, wherein a layer porosity is formed on the hole in the first FRP layer.

2. The method according to claim 1, wherein for connecting the first part to the second part an FRP intermediate layer is arranged in an unhardened state between the first part and the second part.

3. The method according to claim 1, wherein the hole is formed on the first part by cutting out the first FRP layer before the placeholder is inserted.

4. The method according to claim 1, wherein an insert plate is provided as the placeholder.

5. The method according to claim 1, wherein a projection on a mould carrier is provided as the placeholder.

6. The method according to claim 1, wherein the placeholder is provided with a separating means or a separating foil before insertion into the hole.

7. A method for non-destructive testing of a fibre-reinforced plastic (FRP) component comprising:
   producing an FRP comparison body in a method comprising:
      i. producing a first part of the FRP comparison body by
         a. arranging a first FRP layer, the first FRP layer including a hole;
         b. arranging at least one second FRP layer on said first FRP layer; and
         c. pre-hardening the arrangement of said first FRP layer and said at least one second FRP layer to obtain said first part of the FRP comparison body, wherein a placeholder separate from the first FRP layer is inserted into the hole after the hole is produced and before the pre-hardening of the arrangement of said first FRP layer and said at least one second FRP layer, wherein the placeholder is a plate, wherein the placeholder remains in the hole when the arrangement of said first FRP layer and said at least one second FRP layer is pre-hardened, wherein the placeholder prevents the at least one second FRP layer of the arrangement of said first FRP layer and said at least one second FRP layer from projecting into the hole, and wherein the placeholder is removed from the hole before the hardening of an arrangement of the first part and a second part of the FRP comparison body;
      ii. producing the second part of the FRP comparison body by
         a. arranging at least one further FRP layer; and
         b. pre-hardening the arrangement of said at least one further FRP layer in order to obtain said second part of the FRP comparison body;
      iii. connecting said first part to said second part, wherein the hole on said first part is facing said second part; and
      iv. hardening the arrangement of said first part and said second part, wherein a layer porosity is formed on the hole in the first FRP layer;
   testing the FRP component with a non-destructive test method; and
   comparing test results from the non-destructive test method of the FRP component with comparative values from the FRP comparison body.

8. The method according to claim 1, wherein the FRP-components are aircraft components.

9. The method according to claim 4, wherein the insert plate is made of metal.

10. The method according to claim 7, wherein the FRP-component is an aircraft component.

11. The method according to claim 7, wherein the non-destructive test method is a thermography method.

12. A method for producing a fibre-reinforced plastic (FRP) comparison body, wherein the comparison body can be used for modelling a layer porosity and for the non-destructive testing of FRP components, the method comprising:
   i. producing a first part of the FRP comparison body by
      a. arranging a first FRP layer, the first FRP layer including a hole;
      b. arranging at least one second FRP layer on said first FRP layer; and
      c. pre-hardening the arrangement of said first FRP layer and said at least one second FRP layer to obtain said first part of the FRP comparison body, wherein a placeholder separate from the first FRP layer and comprising substantially the same shape or contour as the hole is inserted into the hole after the hole is produced and before the pre-hardening of the arrangement of said first FRP layer and said at least one second FRP layer, wherein the placeholder remains in the hole when the arrangement of said first FRP layer and said at least one second FRP layer is pre-hardened, wherein the placeholder prevents the at least one second FRP layer of the arrangement of said first FRP layer and said at least one second FRP layer from projecting into the hole, and wherein the placeholder is removed from the hole before the hardening of an arrangement of the first part and a second part of the FRP comparison body;

ii. producing the second part of the FRP comparison body by
   a. arranging at least one further FRP layer; and
   b. pre-hardening the arrangement of said at least one further FRP layer in order to obtain said second part of the FRP comparison body;

iii. connecting said first part to said second part, wherein the hole on said first part is facing said second part; and iv. hardening the arrangement of said first part and said second part, wherein a layer porosity is formed on the hole in the first FRP layer.

* * * * *